United States Patent [19]

Moroto et al.

[11] 4,298,085
[45] Nov. 3, 1981

[54] AUTOMATIC FOUR-WHEEL DRIVE TRANSFER CASE

[75] Inventors: Shuzo Moroto, Handa; Koji Kobayashi, Toyota, both of Japan

[73] Assignee: Aisin-Warner K.K., Aichi, Japan

[21] Appl. No.: 94,598

[22] Filed: Nov. 15, 1979

[30] Foreign Application Priority Data

Nov. 24, 1978 [JP] Japan ................. 53-145857

[51] Int. Cl.³ ............. B60K 17/34; F16H 37/06; F16H 1/44
[52] U.S. Cl. ............. 180/247; 74/711; 180/249
[58] Field of Search ........ 180/247, 248, 249; 74/710.5, 711, 665 GC, 665 GE

[56] References Cited

U.S. PATENT DOCUMENTS

| | | | |
|---|---|---|---|
| 3,627,072 | 12/1971 | Smirl | 180/249 |
| 3,650,349 | 3/1972 | Cleveland et al. | 180/249 |
| 3,748,928 | 7/1973 | Shiber | 74/711 |
| 3,845,671 | 11/1974 | Sharp et al. | 74/710.5 |
| 3,955,442 | 5/1976 | Kessmar | 74/665 GE |

Primary Examiner—Joseph F. Peters, Jr.
Assistant Examiner—Donn McGiehan
Attorney, Agent, or Firm—Cooper, Dunham, Clark, Griffin & Moran

[57] ABSTRACT

An automatic four-wheel drive transfer case according to this invention comprises a differential gear connected to the output shaft of a transmission, said differential gear having first and second side gears and a casing, a clutch arranged coaxially with the output shaft for releasably engaging the casing of the differential gear with the side gears thereof, the first side gear being connected with a rearwheel drive output shaft which is arranged on the extension of the output shaft of the transmission, the second side gear being connected with an intermediate shaft arranged coaxially with the output shaft of the transmission, a selective gearing for selectively engaging the second side gear with a front-wheel drive output shaft to change over between two-wheel drive and four-wheel drive, and a clutch control which receives a signal indicating the position of the selective gearing and signals representing the revolution speed of the front-wheel drive output shaft and/or the rear-wheel drive output shaft so as to selectively control the operation of the clutch, whereby the clutch control engages the clutch in two-wheel drive, and in four-wheel drive it engages the clutch when the vehicle speed is below a predetermined level or when the difference in the revolution speed between the front- and rear-wheel drive output shafts is greater than a predetermined value.

7 Claims, 4 Drawing Figures

AUTOMATIC FOUR-WHEEL DRIVE TRANSFER CASE

BACKGROUND OF THE INVENTION

1. Field of the Invention

The invention relates generally to a power transfer mechanism adapted to be incorporated in a multiple path drive system, for example, in a four-wheel drive vehicle. More particularly, it relates to a torque transfer case adapted to receive torque from a prime mover and to provide torque for one drive axle where two-wheel drive is adequate, and to provide torque for both drive axles where four-wheel drive is required.

2. Description of the Prior Art

It is a well known fact that the traction of vehicles can greatly be improved by applying a driving torque to at least two axles of the vehicle at the same time. However, if all the four wheels were driven by the engine, the tire slip would increase when the vehicle makes a turn. Since, during curving, the front wheels must move on radii greater than those of the rear wheels, the revolution speeds of the front wheels are faster than those of the rear wheels. The tires cannot tolerate these adverse conditions for a long period of time, and the undesirable strains that develop in the driving members increase the fuel consumption.

To solve this problem characteristic of four-wheel drive, it is conventionally practiced that a third differential gear is provided in addition to the front- and rear-wheel differential gears to rotate the front and rear drive shafts which in turn drive the front and rear differential gears, respectively, so that when the vehicle changes its direction or when there is a difference between the effective tire radii, only a specific wheel can be driven at high speed.

This kind of differential gear also has a drawback. For example, when one pair of wheels lose traction on a frozen or slippery road surface, they rotate with almost no resistance and this differential gear does not impart driving force to the other pair of wheels. To overcome this problem, the third differential gear is provided with a manual locking device which is actuated to stop the differential action between the two drive shafts and to lock the driven members. However, this kind of locking device is used only for starting and is not necessary when the vehicle is traveling or when the vehicle obtains inertia. In a vehicle whose four wheels are continuously driven, the third differential gear is constantly operated even when the vehicle is traveling on a paved road or when four-wheel drive is not required. This results in increased fuel consumption.

SUMMARY OF THE INVENTION

This invention relates to an automatic four-wheel drive transfer case for automobiles. This automatic four-wheel drive transfer case drives two wheels when the vehicle is running on a paved road and drives four wheels when traveling on an unpaved road. The four-wheel drive transfer case of this invention has a third differential gear in addition to the front- and rear-wheel differential gears to prevent the front and rear wheels from slipping. The third differential gear is automatically locked by a clutch when the vehicle starts on an unpaved slippery road such as a frozen road, so that the fuel can be consumed optimally according to the traveling conditions.

Furthermore, the four-wheel drive transfer case according to this invention is so constructed that the clutch is forcibly engaged when a fault occurs in vehicle speed sensors and a position sensor, both of them comprising an electric circuit of the clutch control means. Thus, the automobile can be started on a frozen slippery road even when a malfunction occurs in the electric circuit.

Figure 1:
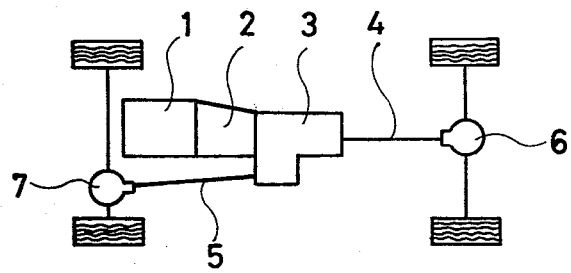
FIG. 1 is a schematic drawing showing an example of an automobile's power transmission mechanism to which the automatic four-wheel drive transfer case of this invention is applied.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

FIG. 1 shows one example of an automobile to which an automatic four-wheel drive transfer case of this invention is applied. The automobile has an engine 1 and a transmission 2 connected to the engine. The four-wheel drive transfer case 3 is connected to the transmission 2 and also linked to a rear-wheel drive axle 4 and a front-wheel drive axle 5. The rear-wheel drive shaft 4 and the front-wheel drive shaft 5 are so constructed as to transmit torque to the rear wheels and the front wheels, respectively, through differential gears 6, 7.

Figure 2:
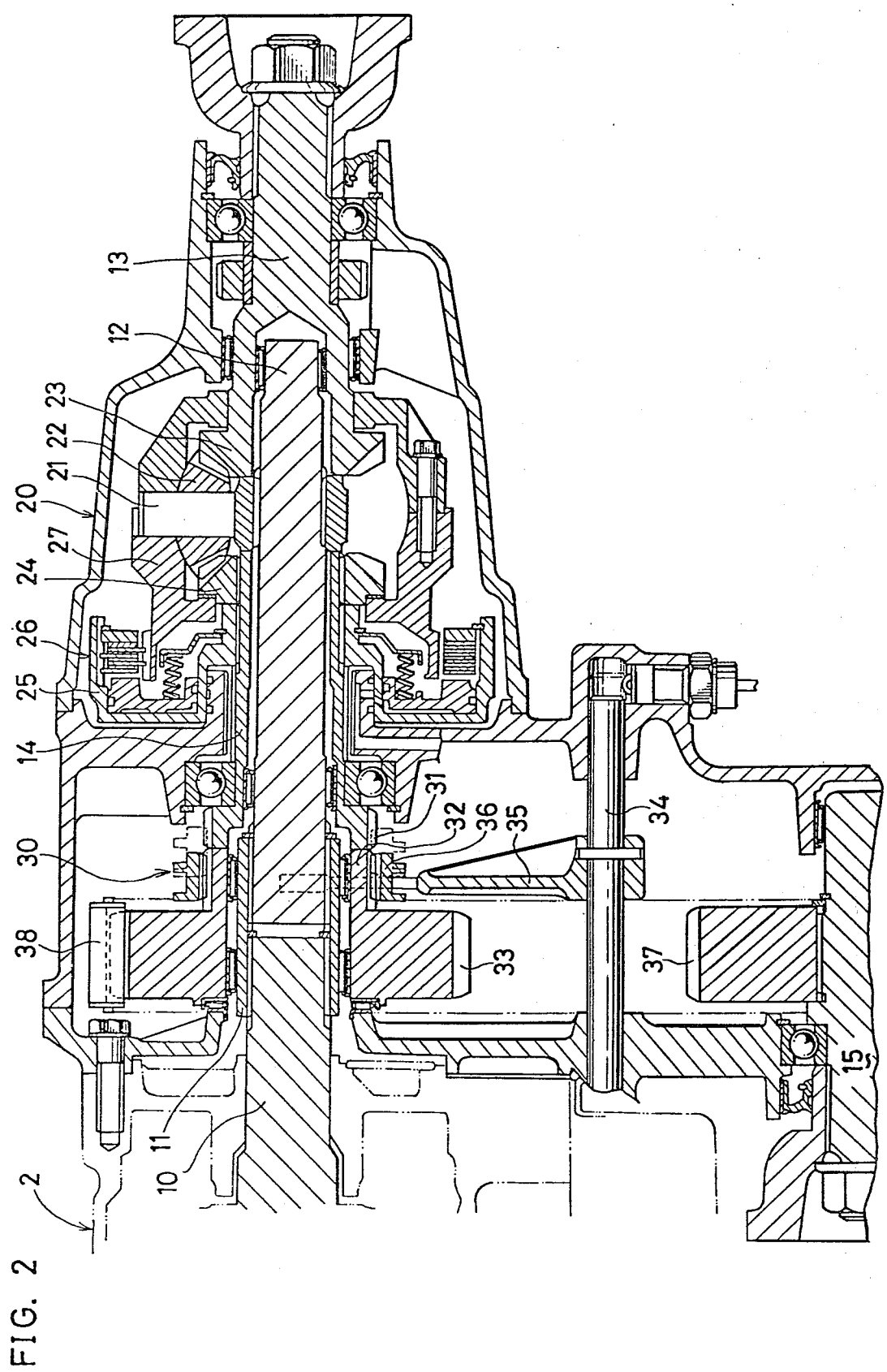
FIG. 2 is a cross-sectional view showing one example of the four-wheel drive transfer case of this invention.

FIG. 2 is a cross-sectional view showing one embodiment of the four-wheel drive transfer case according to this invention. An output shaft 10 of the transmission 2 is spline-connected through a sleeve 11 to an input shaft 12 of a differential gear 20.

The differential gear 20 comprises a pinion shaft 21 connected to the input shaft 12, a pinion gear 22 supported on the pinion shaft 21, and side gears 23, 24 in mesh with the pinion gear 22, with the side gear 23 connected to the rear-wheel drive output shaft 13 which drives the rear-wheel drive axle 4. The side gear 24 is connected to one end of an intermediate shaft 14 rotatably arranged on the input shaft 12. A spur gear 31 of a selective gearing means 30 is secured to the other end of the intermediate shaft 14. The intermediate shaft 14 also has a clutch cylinder 25 spline-engaged therewith. Provided between the clutch cylinder 25 and a casing 27 secured to the pinion shaft 21 is a clutch 26 for releasably engaging them with each other. The selective gearing means 30 comprises the spur gear 31 secured to the intermediate shaft 14, another spur gear 32 rotatably supported on the sleeve 11, a transfer gear 33 formed integral with the spur gear 32, and a shift fork 35 provided on a shaft 34 linked with a shift lever (not shown) at the driver's seat. When two-wheel drive is effected by the shift lever, the gear 36 on the shift fork 35 comes into mesh with the gear 32 and out of mesh with the gear 31, as indicated by the solid line, so that the torque is not transmitted from the intermediate shaft 14 to the transfer gear 33. During four-wheel drive, the gear 36 comes into meshing engagement with both the gears 31 and 32 so that the torque is transmitted from the intermediate shaft 14 to the transfer gear 33.

The transfer gear 33 transmits torque, by way of a chain 38, to a gear 37 provided on a front-wheel drive output shaft 15 arranged in parallel with the output shaft 10 of the transmission. The front-wheel drive output shaft 15 drives the front-wheel drive axle 5.

Figure 3:
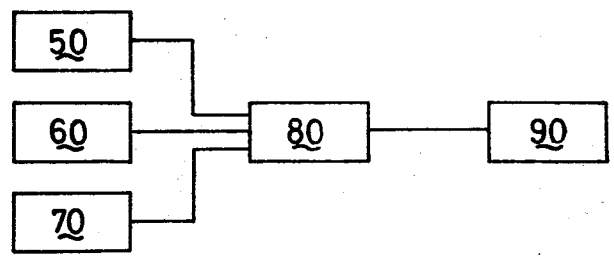
FIG. 3 is a block diagram of a clutch control means for controlling the operation of the clutch.

FIG. 3 is a block diagram of a clutch control means for controlling the operation of the clutch 26. Reference numeral 50 represents a vehicle speed sensor provided to the front-wheel drive output shaft, 60 designates another vehicle speed sensor provided to the rear-wheel drive output shaft, and 70 indicates a position sensor for detecting the position of the selective gearing means. Denoted by 80 is a logic circuit which receives signals from the vehicle speed sensors 50, 60 and the position sensor 70 and produces signals to energize a solenoid which actuates the clutch 26. 90 is a solenoid means which receives the signal produced by the logic circuit 80 to actuate the solenoid and supply the hydraulic pressure to the clutch 26.

Figure 4:
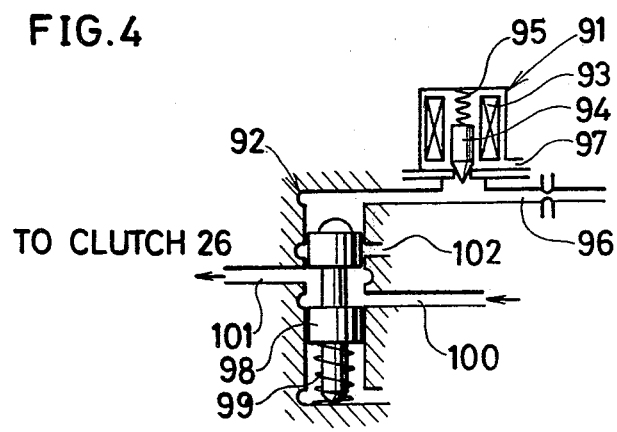
FIG. 4 shows one example of a hydraulic circuit for a solenoid means as illustrated in FIG. 3.

As shown in FIG. 4, the solenoid means 90 consists of a solenoid valve 91 and a changeover valve 92. The solenoid valve 91 is of known construction wherein when the solenoid 93 is energized, the spool 94 is moved upward against the spring 95, discharging the hydraulic pressure in the oil passage 96 through the discharge port 97. When the hydraulic pressure in the passage 96 is exhausted, a spool 98 of the changeover valve 92 is displaced upward by the spring 99, bringing the passage 101 out of communication with the passage 100 and into communication with the discharge port 102, with the results that the hydraulic pressure in the clutch 26 is discharged to disengage the clutch 26.

When the solenoid 93 is not energized, the spool 94 is urged by the spring 95 to assume the lowest position to disconnect the passage 96 from the discharge port 97. This develops hydraulic pressure in the passage 96 and causes the spool 98 of the changeover valve 92 to move down, communicating the passage 100 with the passage 101 and conducting the hydraulic pressure into the passage 101. As a result, the clutch 26 engages.

The clutch control means works as follows.

Two-wheel drive: when the gear 36 of the selective gearing means 30 assumes the position indicated by the solid line, the solenoid is not energized, supplying the pressure to the clutch 26 to engage it.

Four-wheel drive: the gear 36 of the selective gearing means 30 is positioned as indicated by the dotted line. The clutch 26 engages when the vehicle is running at a speed below a predetermined level or when the difference in the revolution speed between the front- and rear-wheel output shafts becomes greater than a predetermined value, i.e., when one pair of the wheels is on a frozen slippery road surface. In other cases, i.e., when the vehicle is traveling under normal condition, the solenoid is energized to disengage the clutch 26.

If a fault occurs in the electric circuit, the vehicle speed sensors 50, 60 or the position sensor 70, the solenoid is not energized so that the clutch 26 engages.

Following is a description of how the four-wheel drive transfer case of this invention operates.

Two-wheel drive: since the gear 36 of the selective gearing means 30 is positioned as indicated by the solid line, the intermediate shaft 14 is not connected to the front-wheel drive output shaft 15. The clutch control means engages the clutch 26 to connect the casing 27 of the differential gear with the side gear 24 which is connected with the clutch cylinder 25.

The power from the output shaft 10 of the transmission is transferred to the pinion shaft 21 and the casing 27 of the differential gear by way of the input shaft 12. At this time, the engagement of the clutch 26 locks the components of the differential gear 20 and rotates them as one unit to drive the rear-wheel drive output shaft 13 through the side gear 23. Since the intermediate shaft 14 connected to the side gear 24 is freewheeling and not linked with the front-wheel drive output shaft 15, the power is not transmitted to the output shaft 15.

Four-wheel drive: since the gear 36 of the selective gearing means 30 is positioned as indicated by the dotted line, the intermediate shaft 14 is linked with the transfer gear 33 by way of the gears 31, 36, 32 and is further linked with the front-wheel drive output shaft 15 by way of the chain 38 and the gear 37.

When the vehicle starts with the four wheels driven, or when the difference in the revolution speed between the front- and the rear-wheel drive output shafts becomes greater than a predetermined value, i.e., when one of the wheels is on a frozen road surface or in a muddy spot on the road, the clutch 26 is engaged by the clutch control means to lock the components of the differential gear 20. As in two-wheel drive, the power from the output shaft of the transmission is transmitted to the rear-wheel drive output shaft 13 and, at the same time, to the front-wheel drive output shaft 15 by way of the selective gearing means 30.

While the vehicle is running under normal conditions, the clutch 26 is disengaged by the clutch control means to allow the differential gear 20 to perform its differential action. As already described, the power from the output shaft 10 of the transmission is transferred to the rear-wheel drive output shaft 13 and the front-wheel drive output shaft 15. The differential gear performs the differential action in the following manner. The pinion gear 22 not only rotates around the periphery of the intermediate shaft 14 and the rear-wheel drive output shaft 13 but also revolves about the pinion shaft 21 to allow relative rotation between the side gears 23 and 24 and therefore permit relative rotation between the intermediate shaft 14 and the rear-wheel drive output shaft 13.

We claim:

1. An automatic four-wheel drive transfer case for a vehicle, comprising:
   (a) a differential gear drivingly connected to an output shaft of a transmission, said differential gear having first and second side gears and a casing;
   (b) a rear-wheel drive output shaft drivingly connected to the first side gear;
   (c) a clutch for releasably engaging the casing to the second side gear;
   (d) a front-wheel drive output shaft;
   (e) selective connection means for selectively connecting the front-wheel drive output shaft to the second side gear when four-wheel drive is selected; and
   (f) clutch control means to engage and disengage the clutch in response to a signal indicating whether two-wheel or four-wheel drive has been selected and in response to signals representing the revolution speed of the rear-wheel and front-wheel drive output shafts.

2. The automatic four-wheel drive transfer case of claim 1, wherein said selective connection means comprises selective gearing means actuated by a shift lever.

3. The automatic four-wheel drive transfer case of claim 1, wherein said clutch control means engages the clutch during two-wheel drive, and during four-wheel drive when the vehicle speed is less than a predetermined level or when the difference in revolution speed of the rear-wheel and front-wheel drive output shafts is greater than a predetermined value.

4. An automatic four-wheel drive transfer case for a vehicle, comprising:
   (a) a differential gear drivingly connected to an output shaft of a transmission, said differential gear having first and second side gears and a casing;
   (b) a rear-wheel drive output shaft drivingly connected to the first side gear;
   (c) a clutch for releasably engaging the casing to the second side gear;
   (d) an intermediate shaft drivingly connected to the second side gear;
   (e) a front-wheel drive output shaft;
   (f) selective gearing means for selectively engaging the intermediate shaft with the front-wheel drive output shaft when four-wheel drive is selected; and
   (g) clutch control means for selectively engaging and disengaging the clutch, said clutch control means having first sensor means to detect whether two-wheel or four-wheel drive has been selected and second sensor means to detect the revolution speed of the rear-wheel and front-wheel drive output shafts, said clutch control means selectively engaging and disengaging the clutch in response to signals produced by the first and second means.

5. The automatic four-wheel drive transfer case of claim 4, wherein said clutch control means engages the clutch during two-wheel drive, and during four-wheel drive when the vehicle speed is less than a predetermined level or when the difference in revolution speed between the rear-wheel and front-wheel drive output shafts is greater than a predetermined value.

6. The automatic four-wheel drive transfer case of claim 5, wherein said clutch comprises a hydraulic clutch actuated by a hydraulic servo, and said clutch control means comprises a first vehicle speed sensor for detecting the revolution speed of the front-wheel drive output shaft, a second vehicle speed sensor for detecting the revolution speed of the rear-wheel drive output shaft, a position sensor for detecting the position of the selective gearing means, a logic circuit which processes signals produced by the sensors, and a solenoid valve which is actuated by a signal produced by the logic circuit to discharge hydraulic pressure in an oil passage leading to the hydraulic servo.

7. The automatic four-wheel drive transfer case of claim 6, wherein hydraulic pressure is supplied to the hydraulic servo to engage the clutch when the solenoid valve is deenergized.

* * * * *